United States Patent [19]

Zulliger

[11] Patent Number: 4,475,409
[45] Date of Patent: Oct. 9, 1984

[54] TRANSDUCER FOR DYNAMOMETER
[75] Inventor: Hans-Rudolf Zulliger, Uetikon, Switzerland
[73] Assignee: Mettler Instrumente AG, Greifensee, Switzerland
[21] Appl. No.: 423,615
[22] Filed: Sep. 27, 1982
[30] Foreign Application Priority Data
Mar. 25, 1982 [CH] Switzerland ............ 1831/82
[51] Int. Cl.³ .............................. G01L 1/22
[52] U.S. Cl. .................... 73/862.65; 338/5
[58] Field of Search ............... 73/862.65, 862.67, 766, 73/767, 775, 781, 782; 338/5

[56] References Cited
U.S. PATENT DOCUMENTS 3,602,041  8/1971  Weinert ................... 73/781 X
3,780,817 12/1973  Videon .................... 73/767 X
4,140,010  2/1979  Kulpmann et al. .......... 73/862.56
4,166,384  9/1979  Matsuda et al. ........... 73/862.65
4,298,382 11/1981  Stempin et al. .
4,331,035  5/1982  Eisele et al. ............ 73/862.67 X
4,381,506  4/1983  Linn et al. .............. 340/870.32

Primary Examiner—Charles A. Ruehl
Assistant Examiner—Brian R. Tumm
Attorney, Agent, or Firm—Marianne Rich

[57] ABSTRACT

The measuring element for a dynamometer consists of a band-shaped substrate of amorphous metal. The band-shaped substrate has one or two necked-down sections on which strain gauge resistors are arranged in the direction of load application. The resistor or resistors may be connected in a bridge circuit together with reference resistors. The load-dependent elongation of the resistors unbalances the bridge circuit to create the desired output measuring signal. Use of a suitable alloy of amorphous metal results in good mechanical characteristic of the measuring element. Specifically, there is a high resistance to creep and to hysteresis effects, while relatively high loads may be measured. Further, such a measuring element is also immune to temperature variations.

9 Claims, 4 Drawing Figures

TRANSDUCER FOR DYNAMOMETER

BACKGROUND AND PRIOR ART

At the present time, conventional metal alloys are used for the measuring element in such transducers. They are described, for example, in German Published application No. 23 49 281.

This type of measuring element creates a number of problems resulting from the characteristics of the materials used. In particular, incorrect measurements may be caused by temperature changes, and in particular, temperature-dependent changes in the modulus of elasticity or in the length. Additionally, errors are introduced by creep and hysteresis effects.

SUMMARY OF THE INVENTION

It is an object of the present invention to furnish a transducer which can be subjected to a high mechanical load without having excessive errors due to creep and hysteresis. It is a further object of the present invention to decrease the changes in the characteristic of the transducer due to temperature variations.

In accordance with the present invention, the transducer is constituted by a band-shaped substrate of amorphous metal on which sensors are arranged whose length varies as a function of applied load. Alloys manufactured in a conventional fashion, for example as described in U.S. Pat. No. 4,298,382, having the general formula $Fe_xB_yCr_z$ may constitute the amorphous metal. Such amorphous metal (also known as metallic glass) has a very small coefficient of linear expansion as a function of temperature. It is even possible that such a coefficient of linear expansion can be zero within the temperature range of interest. Additionally, such amorphous metals are very resistant to tearing and have minimal creep and hysteresis effects. Which specific composition is particularly suitable for a particular application can be determined experimentally.

In a preferred embodiment, the band-shaped substrate has a necked-down section on which a strain gauge is arranged. Such measuring elements require very little material and may be assembled into a very compact unit; that is, a unit having very little height. This is very important in application such as weighing scales.

In another preferred embodiment, the substrate has two necked-down sections which are arranged one after the other in the direction of load application. A strain gauge is arranged in each section, while the load is applied between the two sections. The sensors can then be connected in a series circuit which results in improved linearity and decreased zero drift of the measuring element.

In both embodiments, the strain gauges are preferably arranged symmetrically in pairs.

Preferably the strain gauges are applied to only one side of the substrate, either by vapor deposition or sputtering. This is a particularly economical method for manufacturing the transducer and guarantees that the strain gauge will adhere well to the substrate.

The novel features which are considered as characteristic of the invention are set forth in particular in the appended claims. The invention itself, however, both as to its construction and its method of operation, together with additional objects and advantages thereof, will best be understood from the following description of specific embodiments when read in conjunction with the accompanying drawing.

DESCRIPTION OF THE PREFERRED EMBODIMENT

Figure 1:
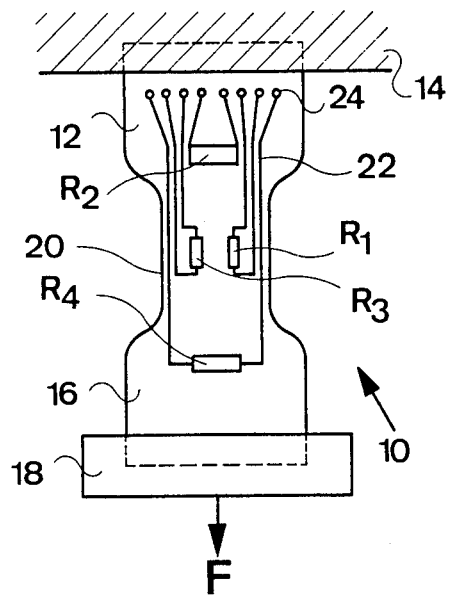
FIG. 1 is a schematic diagram of the first embodiment of the present invention.

In FIG. 1, the measuring element 10 has a fixed end 12 which is clamped into console 14 of the dynamometer. Its free end 16 is connected to the element 18 which applies the force or load to which the dynamometer is subjected. A necked-down section 20 with curved transitions is arranged symmetrically to ends 12 and 16. Two resistors $R_1$ and $R_3$ are arranged on one side of measuring element 10 and in the region of the necked-down section 20. Two additional resistors $R_2$ and $R_4$ are provided outside of the necked-down section and are arranged at an angle of 90 degrees to resistors $R_1$ and $R_3$. Resistors $R_2$ and $R_4$ are reference resistors. Lines 22 connect the ends of the four resistors to contacts 24 to which lead-in wires (not shown) are soldered.

The preferred embodiment of the measuring element has the following dimensions:
Free length between ends 12 and 16: 20 mm;
Width of ends 12 and 16: 10 mm;
Width of necked-down section 20: 5 mm;
Thickness: 0.05 mm;
Tensile strength: Approximately 100 kg.

With the above constants, and depending upon the safety factor relative to the elastic limit, a force of several kgs. may be measured.

Production of measuring element 10 can take place in the following sequence.
punching out of the blanks;
temporary fastening to a support;
surface grinding of the blanks;
applications of the resistors, the lines, and the contact junctions by a well known photo-lithographic process.

Preferably, several blanks are processed simultaneously.

OPERATION

Figure 2:
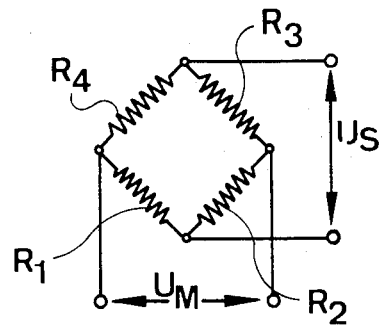
FIG. 2 is the schematic diagram of the bridge circuit associated with the first embodiment.

When measuring element 10 is loaded by application of force F, resistors $R_1$ and $R_3$ are subjected to tension. This causes the bridge circuit (see FIG. 2), to which the supply voltage $U_S$ is applied, to become unbalanced and generate the desired electrical measuring signal $U_M$.

Figure 3:
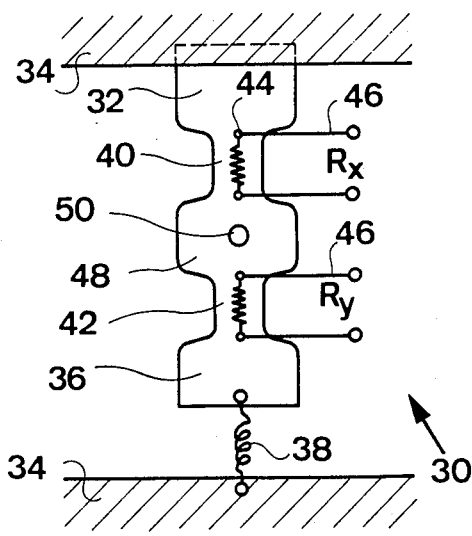
FIG. 3 is the schematic diagram of a second embodiment of the present invention.
Figure 4:
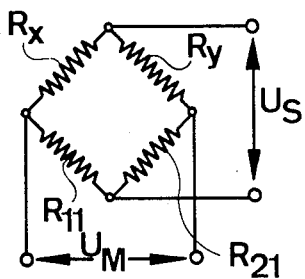
FIG. 4 is the bridge circuit associated with the embodiment of FIG. 3.

The second embodiment is illustrated in FIGS. 3 and 4. It comprises a measuring element 30 which again is clamped to the frame (end 32, console 34). Its lower end 36 is connected to console 34 through a pre-stressing spring 38. Spring 38 has a smaller spring constant than does measuring element 30.

Measuring element 30 has two necked-down sections 40 and 42. A resistor $R_x$ and $R_y$ is applied to the necked-down sections, respectively. For example, the resistors, as well as contact 44 for leads 46 may be vapor deposited. A bore 50 is situated in the central part 48 of measuring element 30. The bore allows fastening of a coupling member (not shown) to allow application of the force or load to be measured. The force is applied in a downward direction, thereby increasing the tension applied to the resistor $R_x$ in the upper necked-down section 40.

Of course the effect of spring 38 must also be taken into consideration. This arrangement results in an improved stability since, for example, temperature variatons result in equal changes in resistors $R_x$ and $R_y$, such changes, therefore, being cancelled out.

FIG. 4 shows the bridge circuit to be used in conjunction with the embodiment of FIG. 3. As was the case in the first embodiment, the resistors in the two necked-down sections 40 and 42 may be arranged in pairs, thereby increasing the maximum output signal i.e., the sensitivity of the circuit. The bridge circuit will then have to be modified correspondingly.

It is also possible to select a spring 38 whose spring constant is much higher than that of measuring element 30. This not only results in a better linearity between the applied force and the electrical output signal, but also results in a doubling of the signal. This is due to the fact that, under the action of the applied force F, the resistance $(R_x)$ changes in one direction, while the resistance $(R_y)$ changes in the opposite direction.

The above described embodiments may be modified in a number of ways. For example, in the first embodiment, measurement could take place using only one or two resistors. This will, of course, result in the disadvantage that the output signal will be smaller and that there would be no automatic compensation of errors such as, for example, temperature variations.

While the invention has been illustrated in preferred embodiments, it is not to be limited to the circuits and structures shown, since many variations, thereof, will be evident to one skilled in the art and are intended to be encompassed in the present invention as set forth in the following claims.

I claim:

1. Transducer for furnishing an electrical signal varying as a function of applied load, comprising
   a band-shaped substrate of amorphous metal; and
   at least one sensor on said substrate for furnishing said electrical signal, said sensor having a load-dependent expansion and an electrical characteristic varying in correspondence to said expansion.

2. A transducer as set forth in claim 1, wherein said band-shaped substrate has a necked-down section; and
   wherein said at least one sensor is located on said necked-down section.

3. A transducer as set forth in claim 2, wherein said at least one sensor comprises a first and second sensor arranged in said necked-down section symmetrically to the center line thereof and in a direction parallel to the direction of load application.

4. A transducer as set forth in claim 3, further comprising a first and second reference element arranged symmetrically to said first and second sensor in a direction perpendicular to said direction of load application, and means for interconnecting said first and second sensor and said first and second reference element to form a bridge circuit.

5. A transducer as set forth in claim 4, wherein said first and second sensor and said first and second reference element are strain gauges.

6. A transducer as set forth in claim 5, wherein all of said strain gauges are applied to one side of said substrate.

7. A transducer as set forth in claim 6, wherein said strain gauges are applied to said substrate by vapor deposition or sputtering.

8. A transducer as set forth in claim 1, wherein said band-shaped substrate has a first and second necked-down section;
   wherein said at least one sensor comprises a first and second sensor arranged in the direction of load application in said first and second necked-down section respectively; and
   wherein said load is applied to said substrate between said first and second necked-down section.

9. A transducer as set forth in claim 1, wherein said amorphous metal is an alloy having the general formula $Fe_xB_yCr_z$.

* * * * *